United States Patent [19]

Doerges et al.

[11] Patent Number: 4,532,116
[45] Date of Patent: Jul. 30, 1985

[54] PROCESS OF DESULFURIZING GASES WITH AN AMINE-CONTAINING ABSORBENT SOLUTION

[75] Inventors: Alexander Doerges; Johann Schlauer; Manfred Kriebel; Anton Hüde, all of Frankfurt am Main, Fed. Rep. of Germany

[73] Assignee: Metallgesellschaft Aktiengesellschaft, Frankfurt am Main, Fed. Rep. of Germany

[21] Appl. No.: 549,347

[22] Filed: Nov. 4, 1983

[30] Foreign Application Priority Data

Nov. 16, 1982 [DE] Fed. Rep. of Germany ....... 3242277

[51] Int. Cl.³ .............................................. B01D 53/34
[52] U.S. Cl. .................... 423/226; 423/228; 423/243
[58] Field of Search ................ 423/226, 228, 229, 243

[56] References Cited

U.S. PATENT DOCUMENTS 3,961,018 6/1976 Williamson ......................... 423/228
4,368,059 1/1983 Doerges et al. ..................... 423/228

Primary Examiner—Earl C. Thomas

[57] ABSTRACT

The gas which contains sulfur compounds consisting of $H_2S$ and/or COS is scrubbed with an absorbent solution which contains at least one amine. The gas to be desulfurized which enters the scrubbing zone is at a temperature in the range of 25° to 100° C. and rises in the scrubbing zone in a countercurrent to the scrubbing solution. The gas leaving the absorbent solution is indirectly cooled to a temperature which is at least 20° C. below the entrance temperature of the gas and is not below 5° C. The indirect cooling results in a condensate, which contains at least one secondary amine. That condensate is passed through the scrubbing zone as an absorbent solution. The condensate leaving the scrubbing zone contains at least 10 moles secondary amine and preferably at least 100 moles secondary amine per mole $H_2S$ and COS in the gas to be desulfurized. The gas to be desulfurized suitably contains secondary amine used in the absorbent solution as well as an organic solvent, such as methanol, ethanol or isopropanol.

12 Claims, 1 Drawing Figure

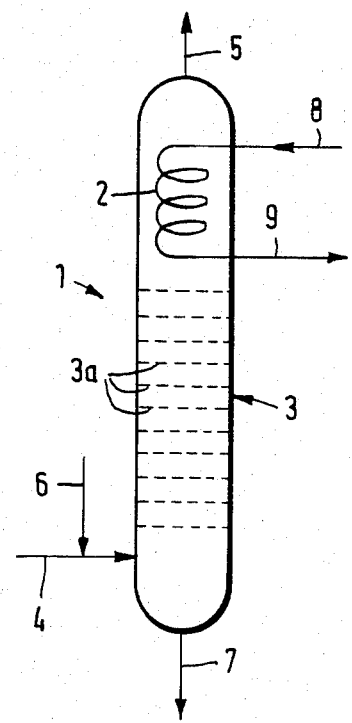

PROCESS OF DESULFURIZING GASES WITH AN AMINE-CONTAINING ABSORBENT SOLUTION

BACKGROUND OF THE INVENTION

1. Field of the Invention

This invention relates to a process of desulfurizing a gas which contains sulfur compounds consisting of $H_2S$ and/or COS with an absorbent solution which contains at least one amine and is conducted in a scrubbing zone in a countercurrent to the rising gas stream.

2. Discussion of Prior Art

Laid-open German Application No. 30 00 250 discloses such a desulfurizing process in which the absorbent solution is circulated through the scrubbing zone and a regenerating zone. For synthesis, e.g., for the synthesis of methanol, it is often necessary to employ gases which must not contain more than 0.1 mg sulfur per cubic meter in order to avoid a deterioration of the delicate catalysts. (In this statement and in the subsequent text the unit "cubic meter" used in connection with a gas applies to a gas at 0° C. and 1.013 bars). In the known process such purity can be achieved only with difficulty because the absorbent solution must be highly regenerated and such regeneration involves a high expenditure for energy and capital investment for equipment.

SUMMARY OF INVENTION

A simple process has now been found by which the above-discussed expenditure can be reduced and nevertheless the required desulfurization can be reliably achieved. This is accomplished according to the invention in that the gas to be desulfurized is at an entrance temperature in the range of 25° to 100° C. as it enters the scrubbing zone, the gas leaving the scrubbing zone is indirectly cooled to a temperature which is lower by at least 20° C. than the entrance temperature and is not lower than 5° C., the indirect cooling results in a condensate which contains at least one secondary amine, that condensate is conducted through the scrubbing zone as an absorbent solution, and the condensate leaving the scrubbing zone contains at least 10 moles secondary amine per mole of $H_2S$ and COS in the gas to be desulfurized. For this ratio the combined amount of $H_2S$ and COS is used.

In the process of the invention it is preferred that there is no circulation of scrubbing solution through the scrubbing zone and a regenerating zone and no regenerated absorbent solution is used in the scrubbing zone.

The process is particularly useful for a fine desulfurization, which may succeed a coarse desulfurization with a circulated absorbent solution. In that case the gas to be subjected to fine desulfurization contains on an anhydrous basis $H_2S$ plus COS not in excess of 5 mg per cubic meter and preferably not in excess of 2 mg per cubic meter. The pressure in the scrubbing zone for fine desulfurization may be selected as desired, for instance, in the range from 0.8 to 100 bars. The gas entering the scrubbing zone for fine desulfurization is preferably at a temperature of 50° to 80° C.

In the process according to the invention the absorbent solution used in the scrubbing zone is produced mainly or entirely by condensing vapors contained in the gas. When the gas has previously been scrubbed with an absorbent solution consisting of a secondary amine and a solvent, the gas will contain evaporated solvent and amine in certain proportions. In case of need, additional secondary amine to be entrained as a vapor can be added to such partly desulfurized gas before it enters the scrubbing zone used for fine desulfurization. Alternatively, the required amine content may be provided by an addition of amine above the scrubbing zone.

Because the desulfurization effected by the condensate flowing through the scrubbing zone depends mainly on the activity of the secondary amines, a substantial water content of that condensate is permissible. On the other hand, the water content of the used condensate leaving the scrubbing zone at its lower end should not exceed 40 mole percent. Additional suitable solvents which enter the condensate are one or more of the alcohols methanol, ethanol or isopropanol. Particularly when COS is to be removed from the gas, a condensate having a low water content will be desirable because an excessive water content will adversely affect the absorption of COS but also of $H_2S$ by the condensate. When the fine desulfurization according to the invention is preceded by a preliminary desulfurization of the gas with an absorbent solution consisting of the same solvent and the same amine, the water vapor content of the gas is usually so low that an optimum fine desulfurization can be performed.

The combination of a preliminary desulfurization and a fine desulfurization and the use of the same active constituents in the scrubbing solution used for the preliminary desulfurization and in the condensate affords the special advantage that the temperature of the absorbent solution can be selected to control the contents of solvent and amine in the gases leaving the preliminary desulfurization and, as a result, the rate at which gas is condensed as a result of the indirect cooling, and the amine content of the condensate. Additionally, the sulfur-containing gas condensate which has become available in the scrubbing zone used for fine desulfurization and has been separated may be added to the absorbent solution for the preliminary desulfurization. Moreover, it is sufficient to remove solvent and amine vapors from the desulfurization gas only once, after the fine desulfurization, rather than also after the preliminary desulfurization, so that the expenditure involved in that removal is reduced.

The fine desulfurization according to the invention may be effected in a particularly desirable manner if the gases contain so much amine that the gas condensate preferably contains at least 100 moles secondary amine per mole $H_2S$ and COS in the gas to be desulfurized. The minimum amine content required in the absorbent solution used for fine desulfurization depends on the pressure and temperature in the scrubbing zone. The lower the residual sulfur content which is permissible in the desulfurized gas, the higher must be the amine content of the condensate. For instance, if the content of residual sulfur in the purified gas must not exceed 0.1 mg sulfur per cubic meter, the condensate leaving the scrubbing zone for that fine desulfurization must contain at least 100 moles secondary amine per mole $H_2S$ and $CO_2$ in the gas fed to the scrubbing zone. This will obviously impose a limitation also on the contents of $H_2S$ and COS which are permissible in the gas to be subjected to fine desulfurization. In gases having a high $CO_2$ content, the mole ratio amine to ($H_2S$+COS) must be higher than with gases which are poor in $CO_2$.

The secondary amine used for the fine desulfurization according to the invention preferably consists of at least one of the following compounds:

N-ethylethanamine
N-(1-methylethyl)-2-propanamine
N-methyl-2-propanamine
N-ethyl-2-propanamine
N-propyl-1-propanamine
N-methyl-1-butanamine
N,2-dimethyl-1-propanamine
N-methyl-2-butanamine An additional advantage afforded by the use of these amines resides in that they selectively combine with the sulfur compounds in spite of the presence of CO2. Diethylamine, dipropylamine or the methyl-butylamines are preferred with gases which contain COS. Diisopropylamine and ethyl isopropylamine are particularly suitable for a selective removal of $H_2S$. Mixtures of several of the amines may also be used.

The process according to the invention permits an economical desulfurization of gases which have low contents of $H_2S$ and/or COS to a high purity and affords the following advantages:

1. The preliminary desulfurization of the gases, e.g., by means of an absorbent solution which is circulated, need not be effected to the required residual content of, e.g., 0.1 mg sulfur per cubic meter but a high residual content of, e.g., 2 mg sulfur per cubic meter, is still permissible. This eliminates the need for substantial expenditures for regenerating the absorbent solution used for the preliminary desulfurization and permits the use of cooling water at a lower rate. Moreover, various smaller sizes are permissible for various units of the equipment.
2. The fine desulfurization may be selectively performed so that the composition of the gases is preserved.
3. The fine desulfurization is highly effective so that the contents of COS and $H_2S$ in the pure gas leaving the scrubbing zone is only one-tenth or much lower than the COS and $H_2S$ contents of the gas entering the scrubbing zone. If a pressure of 1 to 5 bars is maintained in the scrubbing zone, an improvement by a factor of or above 100 can easily be achieved.

DESCRIPTION OF DRAWING

The process of fine desulfurization is diagrammatically shown in the accompanying flow diagram.

DESCRIPTION OF SPECIFIC EMBODIMENT

Referring to the drawing, a column 1 comprises in its upper portion an indirect cooler or dephlegmator 2 and below the unit 2 a scrubbing zone 3, which is provided, e.g., with plates 3a for promoting a mass transfer. Gas which has been subjected to a preliminary desulfurization enters the column 1 through line 4. If the contents of solvent and/or secondary amine in the gas to be desulfurized are not sufficient, these substances are added through line 6. The vapor-containing gas rising through the scrubbing zone contacts the downflowing condensate so that a mass transfer is effected. The condensate is formed on the cooler 2 and flows down through the scrubbing zone 3. The coolant flowing through the cooler 2 may consist, e.g., of water, which is supplied through line 8 and withdrawn through line 9. Purified gas leaves the column 1 through line 5 and used condensate is drained through line 7.

The arrangement shown in the drawing can be modified by the use of a cooler 2 consisting of a separate unit and by the return of the condensate to a reservoir, from which the condensate is pumped to the top of the scrubbing zone 3.

EXAMPLE

In a pilot plant arranged as shown on the drawing, a gas which had been subjected to preliminary desulfurization and was at a temperature of 60° C. and a pressure of 50 bars was supplied through line 4 to the column 1. The gas contained 1.5 mg sulfur as COS, 0.5 mg sulfur as $H_2S$, 0.4 gram mole methanol and 0.02 gram mole diethylamine per cubic meter. The gas was virtually anhydrous and contained 3% by volume $CO_2$. The remaining components were hydrogen and carbon monoxide. The gas in line 4 thus contained 320 moles diethylamine per mole $H_2S$ and COS. A cooling water temperature of 15° C. was maintained in line 8. 0.56 gram mole methanol and 0.015 gram mole diethylamine were condensed on the cooler 2. That condensate flowed downwardly through the mass transfer plates in the scrubbing zone 3 and in the drain 7 had a temperatue of 45° C. and contained 0.0603 millimole $H_2S$ and COS combined with the amine. This means a ratio of 240 moles amine in the condensate per mole $H_2S$ and COS contained in the gas flowing in line 4. The pure gas in line 5 still contained 0.05 mg sulfur as $H_2S$ and 0.02 mg sulfur as COS per cubic meter and was at a temperature of 25° C. As the condensate absorbed only 0.025% by volume $CO_2$ in the scrubbing zone 3, the $CO_2$ content of the pure gas still amounted to 2.975% by volume and had hardly been reduced.

What is claimed is:

1. In a process of desulfurizing a gas containing a $H_2S$ and/or COS in a desulfurization zone and finally in a scrubbing zone with an absorbent which contains at least one secondary amine in an organic solvent, wherein the gas is partly desulfurized in said desulfurization zone and thereafter is subjected to fine desulfurization in a scrubbing zone, the improvement which comprises introducing said gas from said desulfurization zone into said scrubbing zone while at an entrance temperature in the range of 25° to 100° C., said gas containing, on an anhydrous basis, $H_2S$ plus COS not in excess of 5 mg per cubic meter and additionally containing said organic solvent and said secondary amine in vaporized form, passing said gas while in said scrubbing zone upwardly in countercurrent to an absorbent solution, indirectly cooling said gas while in said scrubbing zone to a temperature which is at least 20° C. less than the temperature of said gas at its entrance into said scrubbing zone, but not less than 5° C. whereby to form a condensate containing said secondary amine, conducting said condensate downwardly in said scrubbing zone and bringing it in countercurrent contact with upwardly rising gases therein whereby said condensate functions as an absorbent and said condensate is the only absorbent in said scrubbing zone and withdrawing from the lower end of said scrubbing zone a condensate containing at least 10 mols secondary amine per mol of the combined mols of $H_2S$ and COS in the gas introduced into said scrubbing zone.

2. A process according to claim 1 wherein the gas to be subjected to said fine desulfurization contains a combined amount of $H_2S$ and COS not in excess of 2 mg per cubic meter.

3. A process according to claim 1 wherein the condensate leaving the scrubbing zone contains at least 100 moles secondary amine per mole $H_2S$ and COS in the gas to be desulfurized in said scrubbing zone.

4. A process according to claim 1 wherein the gas to be desulfurized in said scrubbing zone contains a vapor of at least one organic solvent, which is condensed by the indirect cooling, and the secondary amine is dissolved in the condensate.

5. A process according to claim 4 wherein one or more of the alcohols methanol, ethanol and isopropanol are used as the organic solvent.

6. A process according to claim 1 wherein at least one of the compounds
   N-ethylethanamine
   N-(1-methylethyl)-2-propanamine
   N-methyl-2-propanamine
   N-ethyl-2-propanamine
   N-propyl-1-propanamine
   N-methyl-1-butanamine
   N,2-dimethyl-1-propanamine
   N-methyl-2-butanamine is used as a secondary amine.

7. A process according to claim 1 wherein the desulfurization process comprises contacting a gas containing $H_2S$ and/or COS with a countercurrently flowing absorbent solution which contains said secondary amine in said desulfurization zone.

8. A process according to claim 1 wherein the process is conducted such that the water content of the condensate withdrawn from the lower end of the scrubbing zone does not exceed 40 mole percent.

9. A process according to claim 7 wherein the process is carried out at a pressure in the range of 0.8 to 100 bars and the temperature of the gas entering the scrubbing zone is 50° to 80° C.

10. A process according to claim 1 wherein said secondary amine is diisopropylamine or ethyl isopropylamine or a mixture thereof.

11. A process according to claim 1 wherein said indirect cooling is effected using cooling water which is circuated in an indirect heat exchanger.

12. A process according to claim 1 wherein said condensate is returned to a reservoir and from said reservoir is pumped to said scrubbing zone.

* * * * *